US009598566B2

United States Patent
Purmonen et al.

(10) Patent No.: US 9,598,566 B2
(45) Date of Patent: Mar. 21, 2017

(54) SOFT HETEROPHASIC POLYOLEFIN COMPOSITION

(71) Applicant: Borealis AG, Vienna (AT)

(72) Inventors: Jouni Purmonen, Porvoo (FI); Leif Leiden, Andersbole (FI); Norbert Jansen, Wassenberg (DE); Tua Sundholm, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/026,741

(22) PCT Filed: Dec. 18, 2014

(86) PCT No.: PCT/EP2014/003419
§ 371 (c)(1),
(2) Date: Apr. 1, 2016

(87) PCT Pub. No.: WO2015/090594
PCT Pub. Date: Jun. 25, 2015

(65) Prior Publication Data
US 2016/0280900 A1  Sep. 29, 2016

(30) Foreign Application Priority Data

Dec. 19, 2013 (EP) .................................... 13005949

(51) Int. Cl.
*C08L 23/14* (2006.01)
*F16L 58/18* (2006.01)
*F16L 13/02* (2006.01)

(52) U.S. Cl.
CPC ........... *C08L 23/14* (2013.01); *F16L 13/0272* (2013.01); *F16L 58/181* (2013.01);
(Continued)

(58) Field of Classification Search
CPC ................. C08L 23/14; C08L 2203/18; C08L 2205/025; C08L 2207/02; C08L 2310/00; F16L 58/181; F16L 13/0272
See application file for complete search history.

(56) References Cited

FOREIGN PATENT DOCUMENTS

EP   0 491 566 A2   6/1992
EP   0 586 390 B1   3/1994
(Continued)

OTHER PUBLICATIONS

Zweifel, H. Additive Handbook. 5th Edition. Hanser Publications. 2001.
(Continued)

*Primary Examiner* — Michael C Miggins
(74) *Attorney, Agent, or Firm* — Richard M. Klein; Fay Sharpe LLP

(57) ABSTRACT

Heterophasic polypropylene composition having an $MFR_2$ (2.16 kg, 230° C.) of 3.0 to 7.0 g/10 min, determined according to ISO 1 133, and a Vicat A50 softening temperature of more than 110° C. measured according to DIN EN ISO 306 at 10 N on an injection molded test specimen with the dimensions of $80\times10\times4$ mm$^3$ and a heat rate of 50° C./h including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), said heterophasic polypropylene composition having a tensile modulus of 450 to 850 MPa when measured according to ISO 527-2 at 23° C. temperature with an elongation rate of 1 mm/min on injection molded test specimens type 1A prepared according to ISO 1873-2; and a normalized maleic anhydride index IMA equal to or less than 0.036 µm$^{-1}$.

19 Claims, 2 Drawing Sheets

Flow diagram of the first embodiment of the process.

(52) U.S. Cl.
CPC ..... *C08L 2203/18* (2013.01); *C08L 2205/025* (2013.01); *C08L 2207/02* (2013.01); *C08L 2310/00* (2013.01)

(56) References Cited

FOREIGN PATENT DOCUMENTS

| | | |
|---|---|---|
| EP | 0 591 224 B1 | 4/1994 |
| EP | 0 887 379 A1 | 12/1998 |
| EP | 0 911 719 B1 | 4/2000 |
| EP | 1 028 985 B1 | 8/2000 |
| EP | 1 681 315 A1 | 7/2006 |
| EP | 1 911 825 A1 | 4/2008 |
| EP | 1 911 825 B1 | 4/2008 |
| EP | 2 426 171 A1 | 3/2012 |
| EP | 2 573 134 A1 | 3/2013 |
| GB | 2 309 973 A | 8/1997 |
| WO | WO 92/12182 A1 | 7/1992 |
| WO | WO 98/59002 A1 | 12/1998 |
| WO | WO 99/24478 A1 | 5/1999 |
| WO | WO 99/24479 A1 | 5/1999 |
| WO | WO 00/68315 A1 | 11/2000 |
| WO | WO 03/051934 A2 | 6/2003 |
| WO | WO 04/000899 A1 | 12/2003 |
| WO | WO 2004/029112 A1 | 4/2004 |
| WO | WO 2004/111095 A1 | 12/2004 |
| WO | WO 2006/114357 A1 | 11/2006 |
| WO | WO 2007/006657 A1 | 1/2007 |
| WO | WO 2007/096209 A1 | 8/2007 |
| WO | WO 2008/142019 A1 | 11/2008 |

OTHER PUBLICATIONS

International Search Report for International Application No. PCT/EP2014/003419 dated Nov. 3, 2015.

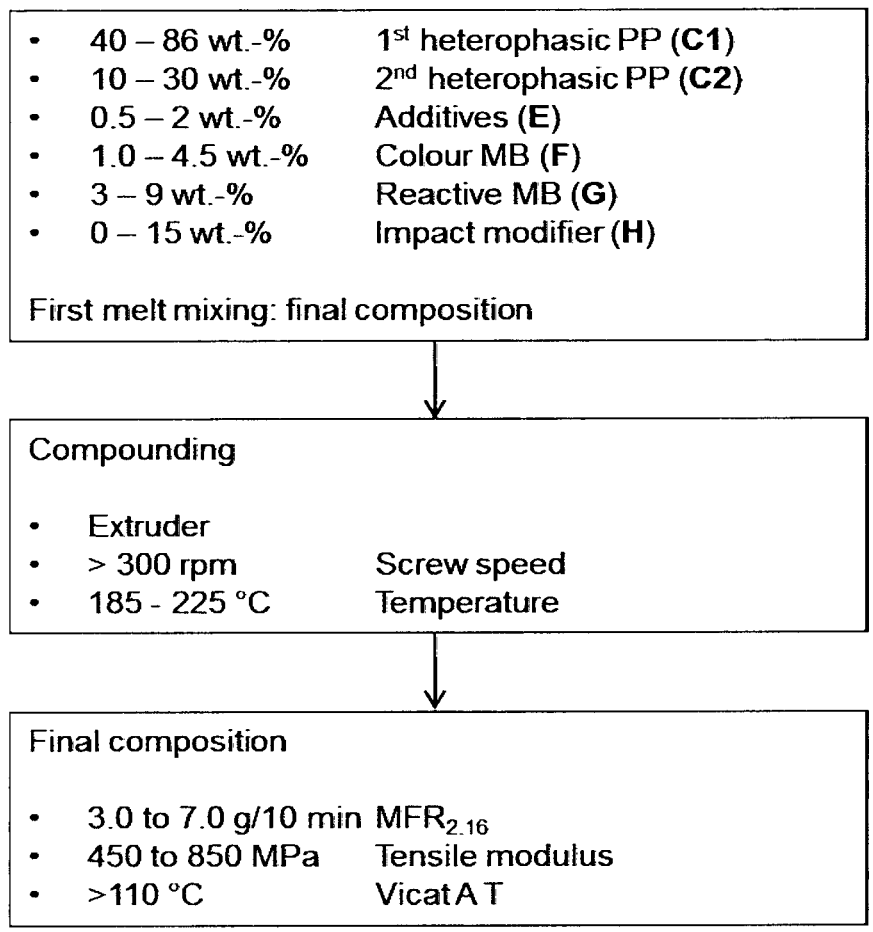
Figure 1. Flow diagram of the first embodiment of the process.

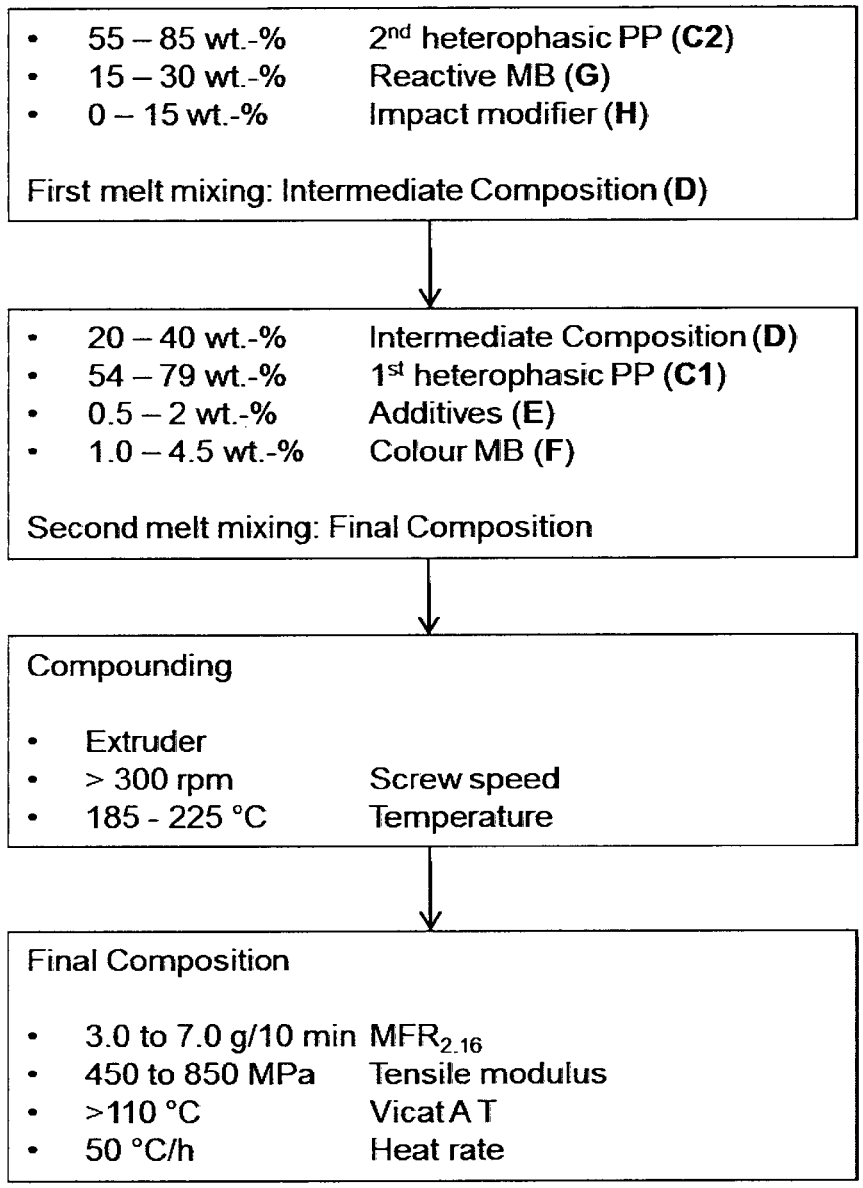
Figure 2. Flow diagram of the second embodiment of the process.

SOFT HETEROPHASIC POLYOLEFIN COMPOSITION

The present invention relates to a heterophasic polyolefin composition comprising a matrix comprising a propylene homo- and/or copolymer and an alpha-olefin copolymer rubber dispersed in the matrix forming the rubber phase providing high peel strength and good impact properties. The present invention further relates to a process for the preparation of such a heterophasic polyolefin composition, articles made therefrom and uses of the heterophasic polyolefin composition.

RELATED ART

Polyolefin compositions are widely used for the coating of structures such as pipes. A typical example is the coating of steel, for example a steel pipe, by a multilayer system of epoxy primer/adhesive composition/polyethylene or polypropylene composition, with the polyethylene or polypropylene forming the side being exposed to the environment. The increasing demands of onshore and offshore steel coatings as to reliability and long term stability ask for further improved compositions.

EP 1 911 825 A1 describes an adhesive heterophasic polypropylene composition having extremely high peel strength and a melt flow rate of 5 to 10 g/10 min and a Vicat A50 softening temperature of 130 to 160° C. The adhesive composition described therein is not suitable as an outer coating layer.

EP 1 681 315 describes a heterophasic material having properties suitable for a variety of applications, but the therein described material is not cross-linked leading to non-adhesive properties.

However, such materials as described in EP 1 911 825 A1 are limited as to their elongation at break both at room temperature and at −20° C. and as to their processability. In addition to that the existing compositions require the presence of a adhesive layer which leads to complexity of the total coating. Further materials used as adhesive layers for pipe coating are described in WO 2007/096 209 and GB 2 309 973.

Thus there was the need for a composition suitable to replace the two-layer system consisting of an adhesive layer and a polyolefin layer which simultaneously provides excellent elongation properties at yield both at room temperature and −20° C. as well as excellent processability and good high temperature properties. These properties can be provided at best by soft polypropylene compositions, which are also ecologically inert, such as described in WO 2006/114 357, EP 1 681 315, EP 0 991 719, and WO 2008/142 019.

OBJECTIVE OF THE PRESENT INVENTION

The present invention is based on the finding that excellent elongation properties can be obtained when a heterophasic polypropylene is used, whereby the fraction insoluble in p-xylene at 23° C. (XCU fraction) is at least partially a random heterophasic polypropylene copolymer, the tensile modulus is adjusted within the range of 450 to 850 MPa, and the normalized maleic anhydride index $I_{MA}$ is set equal to or less than 0.036 $\mu m^{-1}$.

SUMMARY OF THE INVENTION

The present invention therefore provides a heterophasic polypropylene composition having an MFR (2.16 kg, 230° C.) of 3.0 to 7.0 g/10 min, determined according to ISO 1133, and a Vicat A50 softening temperature of more than 110° C. measured according to DIN EN ISO 306 using test method A50, on an injection moulded test specimen with the dimensions of 4×80×10 mm³. including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), said heterophasic polypropylene composition having a tensile modulus of 450 to 850 MPa when measured according to ISO 527-2 at 23° C. temperature with a cross head speed of 1 mm/min on injection moulded test specimens type 1A prepared according to ISO 1873-2;

and a normalized maleic anhydride index $I_{MA}$ equal to or less than 0.036 $\mu m^{-1}$ measured according to the method described in the experimental part.

The heterophasic polypropylene composition according to the present invention is preferably obtainable via two embodiments (FIGS. 1 and 2).

The first embodiment includes a single melt mixing process of two heterophasic polypropylenes, a colour and a reactive masterbatch, an impact modifier and further additives (FIG. 1).

The second embodiment includes two steps involving the melt mixing of a heterophasic polypropylene, additives and a colour masterbatch giving an intermediate composition and subsequent melt mixing of said intermediate composition with a second heterophasic polypropylene, a reactive masterbatch and an impact modifier (FIG. 2).

The present invention further provides a heterophasic polypropylene composition having an MFR (2.16 kg, 230° C.) of 3.0 to 7.0 g/10 min and having a tensile modulus of 450 to 850 MPa when measured according to ISO 527-2 at 23° C. temperature with an elongation rate of 1 mm/min on injection moulded test specimens type 1A prepared according to ISO 1873-2 and a Vicat A50 softening temperature of more than 110° C. measured according to DIN EN ISO 306 using test method A50 on a test specimen with the dimensions of 4×80×10 mm³ including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), whereby the heterophasic polypropylene composition is obtainable by (s. FIG. 1)

Melt Mixing a first heterophasic polypropylene composition (C1) in an amount of 40 to 86 wt.-% with 10 to 30 wt.-% of a second heterophasic polypropylene composition (C2), 0 to 15 wt.-% of an impact modifier (H), to 4.5 wt.-% of a colour masterbatch (F), 3 to 9 wt.-% of a reactive masterbatch (G)

in the presence of 0.5 to 2.0 wt.-% additives (E) all weight percentages with respect to the final heterophasic polypropylene composition, whereby the first heterophasic polypropylene composition (C1) has an MFR (2.16 kg, 230° C.) of 2.5 to 6.5 g/10 min and includes a propylene random copolymer matrix phase (A1) and an ethylene-propylene copolymer rubber phase (B1) dispersed within the matrix phase; and whereby the second heterophasic polypropylene composition (C2) has an MFR (2.16 kg, 230° C.) of 2.5 to 6.5 g/10 min and includes a propylene homopolymer matrix phase (A2) and an ethylene-propylene copolymer rubber phase (B2) dispersed within the matrix phase; and whereby the reactive masterbatch (G) contains a polypropylene homo- or copolymer having an MFR (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the polypropylene masterbatch, and whereby the colour masterbatch (F) contains a polyethylene or polypropylene homo- or copolymer in an amount of 40 to 75 wt.-%, 25 to 60 wt.-% pigments with respect to the polypropylene masterbatch.

In yet a further embodiment the present invention provides a heterophasic polypropylene composition having an MFR (2.16 kg, 230° C.) of 3.0 to 7.0 g/10 min and having a tensile modulus of 450 to 850 MPa when measured according to ISO 527-2 at 23° C. temperature with a cross head speed of 1 mm/min on injection moulded test specimens type 1A prepared according to ISO 1873-2, and a Vicat A50 softening temperature of more than 110° C. measured according to DIN EN ISO 306 using test method A50 on an injection moulded test specimen with the dimensions of 4×80×10 mm$^3$;

including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), whereby the heterophasic polypropylene composition is obtainable by melt mixing a first heterophasic polypropylene composition (C1) in an amount of 54 to 79 wt.-% with 20 to 40 wt.-% of an intermediate composition (D) and 1 to 4 wt.-% of a colour masterbatch (F) in the presence of 0.5 to 2.0 wt.-% additives (E), with respect to the final heterophasic polypropylene composition, whereby the first heterophasic polypropylene composition has an MFR (2.16 kg, 230° C.) of 2.5 to 6.5 g/10 min and includes a propylene random copolymer matrix phase (A1) and an ethylene-propylene copolymer rubber phase (B1) dispersed within the matrix phase; and whereby the intermediate composition (D) is obtainable by (s. FIG. 2)

melt mixing a second heterophasic polypropylene (C1) in an amount of 55 to 85 wt.-% with 15 to 30 wt.-% of a reactive masterbatch (G) and 0 to 15 wt.-% of an impact modifier (E) with respect to the intermediate composition (D), whereby the second heterophasic polypropylene (C2) has an MFR (2.16 kg, 230° C.) of 1 to 6.5 g/10 min and includes a propylene homopolymer matrix phase (A2) and an ethylene-propylene copolymer rubber phase (B2) dispersed within the matrix phase; and whereby the reactive masterbatch contains a polypropylene homo- or copolymer having an MFR (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the polypropylene masterbatch, and whereby the colour masterbatch (F) contains a polyethylene or polypropylene homo- or copolymer in an amount of 40 to 75 wt.-% and 25 to 60 wt.-% pigments with respect to the polypropylene masterbatch.

DEFINITIONS

Heterophasic polypropylene composition as used herein denotes "heterophasic polyolefin composition" comprising more than 75 wt.-% molecular units derived from propylene.

The term "heterophasic polypropylene composition" denotes compositions including an olefin polymer matrix resin and an elastomeric olefin polymer dispersed in said matrix resin.

The heterophasic polypropylene composition according to the present invention has a fraction soluble in p-xylene at 23° C. (XCS fraction), and a fraction insoluble in p-xylene at 23° C. (XCU fraction). The fraction insoluble in p-xylene at 23° C. (XCU) is equal to 100%−XCS %.

"Melt mixing" means subjecting the optionally premixed mixture to a melt mixing device.

"Catalyst" denotes the organometallic compound containing the reaction centre of the polymerisation.

"Catalyst system" denotes the mixture of the catalyst, the optional cocatalyst and the optional support.

"Melting temperature $T_m$" denotes the highest melting temperature in the DSC analysis when more than one melting point is observed.

"Crystallization temperature $T_a$" denotes the highest crystallization temperature in the DSC analysis when more than one crystallization point is observed.

The term "comonomer content" defines the content of all α-olefins in the composition apart from propylene given in weight percent in regard to the total composition.

In the present invention, the term "matrix" is to be interpreted in its commonly accepted meaning, i.e. it refers to a continuous phase (in the present invention a continuous polymer phase) in which isolated or discrete particles such as rubber particles are dispersed.

As used in the present invention, the term "rubber" corresponds to the commonly accepted meaning and refers to an elastomeric polymeric material. The rubber naturally is of high amorphous nature and therefore mainly forms the XCS fraction.

In the sense of the present invention "reactive masterbatch" means a concentrated premix of a propylene polymer, a free radical forming peroxide, and maleic anhydride.

In the sense of the present invention "colour masterbatch" means a concentrated premix of a polyethylene or propylene polymer in regard to the total weight of the composition one or more pigments, and optional additives.

In the sense of the present invention "impact modifier" means a polymer, which improves the impact capabilities of the final composition.

In the sense of the present invention "pigments" means special additives, which influence the colour of the final composition.

"Additives", as used in the present invention, denotes modifiers and additives, which can influence existing properties of or add new properties to the final composition, except pigments and impact modifiers.

"$1^{st}$ heterophasic polypropylene composition" as used in the present application denotes the heterophasic polypropylene composition, which is the first composition melt mixed in the one-step melt mixing process or which is melt mixed in the first process of the two step melt mixing process.

"$2^{nd}$ heterophasic polypropylene composition" as used in the present application denotes the heterophasic polypropylene composition, which is the second composition melt mixed in the one-step melt mixing process or which is melt mixed in the second process of the two step melt mixing process.

Final Heterophasic Polypropylene Composition

MFR

The heterophasic polypropylene composition according to the present invention has a $MFR_2$ measured according to ISO 1133 (2.16 kg, 230° C.) of preferably 3.0 to 7.0 g/10 min, more preferably of 3.2 to 4.8 g/10 min and most preferably of 3.9 to 4.7 g/10 min.

Comonomer Content

The comonomer content of the heterophasic polyolefin composition according to the present invention is not more than 17 wt. %, preferably in the range of 5 to 15 wt. %, more preferably 6 to 13 wt. % and most preferably in the range of 7 to 11 wt. %.

Highest Melting Temperature $T_m$

The heterophasic polypropylene composition according to the present invention has a highest melting temperature $T_m$ preferably of 150 to 164° C., more preferably of 155 to 163° C. and most preferably of 160 to 163° C.

Highest Crystallization Temperature $T_c$

The heterophasic polypropylene composition according to the present invention has a highest crystallization temperature $T_c$ preferably of 100 to 130° C., more preferably of 104 to 125° C. and most preferably of 110 to 122° C.

Normalized Maleic Anhydride Index $I_{MA}$

The heterophasic polypropylene composition according to the present invention has a normalized maleic anhydride index $I_{MA}$ of equal to or less than 0.036 $\mu m^{-1}$, preferably equal to or less than 0.034 $\mu m^{-1}$, more preferably equal to or less than 0.032 $\mu m^{-1}$ and most preferably equal to or less than 0.0315 $\mu m^{-1}$ determined by IR absorbance measurements at the multiple absorbance bands between 1790 and 1710 $cm^{-1}$, specifically the strong absorption at 1742 $cm^{-1}$, at a specimen thickness between 265 to 280 $\mu m$ in standard transmission mode on a Perkin-Elmer Spectrum One FTIR spectrometer using 16 scans and a spectral resolution of 2 $cm^{-1}$ and subsequent quantification of the maleic anhydride index $I_{MA}$ as the absorption of the carbonyl stretching bands being normalised to the measured film thickness (d) in units of microns.

XCS

The heterophasic polypropylene composition according to the present invention has a XCS phase in the amount of 18 to 30 wt.-%, preferably 18 to 28 wt.-% and most preferably 18 to 24 wt.-%.

XCU

The heterophasic polypropylene composition according to the present invention has a XCU phase in the amount of 70 to 82 wt.-%, preferably 72 to 82 wt.-% and most preferably 76 to 82 wt.-%.

Further Characterization of the Final Heterophasic Polypropylene Composition

Tensile Modulus 23° C.

The heterophasic polypropylene composition according to the present invention preferably has a tensile modulus at 23° C. of above 600 MPa, more preferably above 625 MPa, even more preferably above 650 MPa, the tensile modulus being determined according to ISO 527-2 at +23° C. and a cross head speed of 1 mm/min on injection moulded specimen (specimen type 1A, 4 mm thickness) prepared by injection moulding in line with ISO 1873-2.

Elongation at Break 23° C.

The heterophasic polypropylene composition according to the present invention preferably has a elongation at break determined according to ISO 527-2 at 23° C. with a cross head speed 50 mm/min on injection moulded specimens (specimen type 1A, 4 mm thickness) prepared by injection moulding in line with ISO 1873-2 of more than 450%, more preferably more than 500%, even more preferably more than 520% and most preferably more than 530%. Usually the elongation at break will not be higher than 850%.

Elongation at Yield 23° C.

The heterophasic polypropylene composition according to the present invention preferably has a elongation at yield determined according to ISO 527-2 at 23° C. with a cross head speed 50 mm/min on injection moulded specimens (specimen type 1A, 4 mm thickness) prepared by injection moulding in line with ISO 1873-2 of more than 8%, more preferably more than 10%, even more preferably more than 12% and most preferably more than 14%. Usually the elongation at yield will not be higher than 20%.

Tensile Modulus −20° C.

The heterophasic polypropylene composition according to the present invention preferably has a tensile modulus at −20° C. of above 2000 MPa, more preferably above 2100 MPa, even more preferably above 2300 MPa, the tensile modulus being determined according to ISO 527-2 at −20° C. and a cross head speed of 1 mm/min on injection moulded specimen (type 5A, 2 mm thickness) prepared by injection moulding in line with ISO 1873-2. Usually the tensile modulus at −20° C. will not be higher than 3200 MPa.

Elongation at Break −20° C.

Moreover, the heterophasic polypropylene composition according to the present invention preferably has a elongation at break at −20° C. with a cross head speed of 20 mm/min determined on specimens injection moulded in line with ISO 1873-2 (specimen type 5A, 2 mm thickness) of more than 100%, more preferably more than 125%, even more preferably more than 150% and most preferably more than 175%. Usually the elongation at break will not be higher than 400%.

Elongation at Yield −20° C.

The heterophasic polypropylene composition according to the present invention preferably has a elongation at yield determined according to ISO 527-2 at −20° C. with a cross head speed 20 mm/min on injection moulded specimens (specimen type 5A, 2 mm thickness) prepared by injection moulding in line with ISO 1873-2 of more than 6%, more preferably more than 7%, even more preferably more than 8% and most preferably more than 9%. Usually the elongation at yield will not be higher than 15%.

Vicat A50 Softening Temperature

Moreover the heterophasic polypropylene composition according to the present invention has a Vicat A50 softening temperature preferably of more than 90° C., more preferably of more than 100° C. and most preferably of more than 110° C. when measured according to DIN EN ISO 306 at 10 N on an injection moulded test specimen prepared according to ISO 1873-2 with the dimensions of 4×80×10 $mm^3$. The heat rate is 50° C./h in the A50 method. Usually, the Vicat A50 softening temperature is not higher than 137° C.

Notched Charpy Impact Strength at 23° C.

The heterophasic polypropylene composition according to the present invention has a Charpy Notch index at 23° C. preferably of 11 to 50 $J/m^2$, more preferably of 11 to 30 $J/m^2$ and most preferably of 11 to 25 $J/m^2$ when measured according to ISO 179-1eA-1:2000 on V-notched samples at 23° C.

Notched Charpy Impact Strength at −20° C.

The heterophasic polypropylene composition according to the present invention has a Charpy Notch index at −20° C. preferably of 2 to 8 $J/m^2$, more preferably of 2 to 6 $J/m^2$ and most preferably of 2 to 4 $J/m^2$ when measured according to ISO 179-1eA:2000 on V-notched samples at −20° C.

The Charpy properties are enhanced by using polyethylene carriers for the colour masterbatch, whereas the Vicat temperature is lowered.

Indentation Hardness (Shore Hardness)

Furthermore, the heterophasic polypropylene composition according to the present invention has indentation hardness (Shore D) preferably of 52 to 59, more preferably of 55 to 58.5, and most preferably of 56 to 58 when measured according to ISO 868 after an indentation time of 15 s on specimens prepared by injection moulding according to ISO 1873-2.

Peel Strength at 23° C.

The heterophasic polypropylene composition according to the present invention has a peel strength at 23° C. preferably of above 200, more preferably above 250 and most preferably above 300 to 380 N/mm measured according to ISO 21809-1 Annex C, using a tensile testing machine.

Peel Strength at 80° C.

The heterophasic polypropylene composition according to the present invention has a peel strength at 80° C. preferably of above 150 to, more preferably of above 200 and most preferably above 250 to 380 N/mm measured according to ISO 21809-1 Annex C, using a tensile testing machine.

XCU Fraction

Preferably the XCU fraction is present in an amount of in the amount of 70 to 82 wt.-%, preferably 72 to 82 wt.-% and most preferably 76 to 82 wt.-%. to 79 wt.-%. Preferably the XCU fraction has a comonomer content of 1.0 to 5.2 wt.-%, more preferably 2.0 to 5.0 wt.-% and most preferably 3.0 to 4.8 wt.-%.

A heterophasic polypropylene homo- or copolymer can be made in a combination of slurry and gas phase reactors. Those processes are well known to one skilled in the art. A preferred process is a "loop-gas phase"-process, such as developed by Borealis A/S, Denmark (known as BORSTAR® technology) described e.g. in the patent literature, such as in EP 0 887 379 or in WO 92/12182.

Usually the XCU fraction originates from a blend of two matrix phases from two identical or different heterophasic polypropylenes. Preferably the XCU fraction originates from a blend of two heterophasic polypropylenes a first polypropylene having a XCU fraction including a propylene ethylene copolymer and a second polypropylene having a XCU fraction including a propylene homopolymer. It is needless to say that the resulting XCU blend will be a polypropylene copolymer.

XCS Fraction

In addition to the XCU fraction as described above, the heterophasic polymer composition of the present invention comprises a XCS fraction.

The XCS fraction is present in the amount of 18 to 30 wt.-%, preferably 18 to 28 wt.-% and most preferably 18 to 24 wt.-%. with respect to the total heterophasic polypropylene composition.

It is preferred that, the p-xylene soluble fraction (XCS) has an amount of propylene-derived monomer units of 45 to 75 wt. %, preferably 50 to 70 wt. %, more preferably 55 to 65 wt. % with respect to the total XCS fraction.

The comonomer content of the p-xylene soluble fraction (XCS) 25 to 55 wt. %, preferably 30 to 50 wt. %, more preferably 35 to 45 wt. % with respect to the total XCS fraction.

Preferably, the p-xylene soluble fraction (XCS) comprises an ethylene/propylene, ethylene/butane, ethylene/hexene, ethylene/octene copolymer, more preferably an ethylene/propylene copolymer.

In another embodiment the p-xylene soluble fraction (XCS) consists of a blend of ethylene/propylene, ethylene/octene copolymers, ethylene/butene copolymers, ethylene/hexane copolymer and/or low density polyethylene.

In another embodiment, the xylene soluble fraction (XCS) contains a LDPE. The LDPE preferably has a melt flow rate of 2.0 to 8.0 g/10 min (load 2.16 kg; ISO 1133-1:2012). The LDPE preferably has a density of below 925 kg/m$^3$.

Further preferably, the XCS fraction has an intrinsic viscosity determined with decalin according to DIN EN ISO 1628-1 and -3 of 1.2 to 3.0 dl/g, more preferably 1.4 to 2.5 dl/g.

Pigments

Pigments may be added to the colour masterbatch as needed. Said pigments can be inorganic, e.g. chrome oxide pigments (green 17, yellow 34), cobalt pigments (green 26, green 50), cadmium pigments (yellow 35, orange 20), iron oxide pigments (red 101), and ultramarine pigments (blue 29), or organic, e.g. anthraquinone pigments (yellow 147, red 177, blue 60), azo pigments (orange 64), phtalocyanin pigments (blue 15, green 7, green 36), and disazo condensation pigments (yellow 95, yellow 13), the numbers referring to "*Additive Handbook*", 5th edition, by H. Zweifel, Hanser Publications, 2001 incorporated by reference herewith.

Additives (E)

Additives may be added to the polypropylene composition as occasion demands. Additives can be used to influence the properties of the composition by either modifying the properties of the composition (modifiers) or adding new properties to the final composition (additives). Preferably, the additives are selected from the group of antioxidants, UV-stabilizers or radical scavengers, such as hindered amine light stabilizers (HALS).

The amount of these additives, i.e. the sum of all these additives is preferably amounts to 0.1 to 8 wt.-%, preferably to 0.2 to 5 wt.-%, more preferably to 0.3 to 3 wt.-% and most preferably to 0.5 to 2 wt.-% with respect to the total heterophasic composition.

These additives may be included during the polymerisation process or after the polymerisation by melt mixing.

It is however preferred that the additives do not negatively affect the desirable properties of the composition as discussed above.

1$^{st}$ Heterophasic Polypropylene Composition (C1)

The first heterophasic polypropylene composition has an MFR$_2$ (2.16 kg, 230° C.) of 2.5 to 6.5 g/10 min, more preferably 3.5 to 5.5 g/10 min and most preferably 3.5 to 4.5 g/10 min and includes a propylene random copolymer matrix phase (A1) and an ethylene-propylene copolymer rubber phase (B1) dispersed within the matrix phase.

The first heterophasic polypropylene composition preferably has a comonomer content of 6 to 10 wt.-%, more preferably 7 to 9 wt.-%.

The first heterophasic polypropylene composition preferably has a fraction insoluble in p-xylene at 23° C. (XCU fraction) having an comonomer content of 1.5 to 5.5 wt.-%, more preferably 2.0 to 4.5 wt.-%, most preferably 3.0 to 4.5 wt.-%.

The first heterophasic polypropylene composition preferably has a fraction soluble in p-xylene at 23° C. (XCS fraction) in an amount of 22 to 28 wt.-%, more preferably 24 to 27 wt.-%.

The first heterophasic polypropylene preferably has a fraction soluble in p-xylene at 23° C. (XCS fraction), the XCS fraction having an intrinsic viscosity of 1.20 to 1.40 dl/g in tetralin at 135° C., more preferably 1.25 to 1.35 dl/g in tetralin at 135° C.

It is preferred that the 1$^{st}$ heterophasic polypropylene composition (C1) is obtained by a BORSTAR® process, i.e. is obtained by polymerization in a loop reactor as the 1$^{st}$ reactor followed by transfer of the intermediate to a second reactor being a gas phase reactor.

2$^{nd}$ Heterophasic Polypropylene Composition (C2)

The second heterophasic polypropylene composition preferably as an comonomer content of 8 to 15 wt.-%, more preferably 9 to 14 wt.-% and most preferably 10 to 13 wt.-%.

The second heterophasic polypropylene composition preferably has a melt flow rate MFR$_2$ (2.16 kg, 230° C.) of 2.5 to 6.5 g/10 min, more preferably 3.5 to 5.5 g/10 min and most preferably 3.5 to 4.5 g/10 min.

The second heterophasic polypropylene composition preferably has a XCS content of 18 to 22 wt.-%

The XCS phase of second heterophasic polypropylene composition preferably has a comonomer content of 30 to 50 wt.-%, more preferably of 33 to 45 wt.-%, and most preferably of 35 to 40 wt.-%.

It is preferred that the 2$^{nd}$ heterophasic polypropylene composition (C2) is obtained by a Spheripol process.

Reactive Masterbatch (G)

The reactive masterbatch preferably contains a polypropylene homo or copolymer having an MFR$_2$ (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the reactive masterbatch, preferably has an MFR$_2$ (2.16 kg, 230° C.) of 45 to 60 g/10 min, more preferably 50 to 57 g/10 min. Preferably, the reactive masterbatch contains a heterophasic propylene base polymer as disclosed in EP 1 911 825 B2.

The maleic anhydride content of the reactive masterbatch preferably is 0.4 to 1.0 wt.-%, more preferably 0.5 to 0.8 wt.-% with respect to the reactive masterbatch.

Colour Masterbatch (F)

The colour masterbatch contains a polyethylene or polypropylene homo- or copolymer in an amount of 40 to 75 wt.-% and 25 to 60 wt.-% pigments with respect to the colour masterbatch.

It should be noted that it is not a must to add the optional pigments via a masterbatch. However for practical reasons and to achieve good homogeneity, the use of a colour masterbatch is preferred.

Impact Modifier (H)

The impact modifier preferably has a MFR (2.16 kg, 190° C.) of 1 to 20 g/10 min, more preferably 1 to 10 g/10 min.

More preferably the impact modifier (H) are selected from the group of $C_2C_3$, $C_2C_4$, $C_2C_8$ and/or LDPE impact modifier. Most preferably the impact modifiers (H) are selected from the group of $C_2C_8$ impact modifiers.

Examples of commercially available $C_2C_8$ impact modifiers are marketed under the trademarks Engage, Queo, Exact, Tafmer and the like.

Process for Obtaining Inventive Polypropylene Composition and Product Obtained Thereby In a first embodiment the heterophasic polypropylene composition according to the present invention having an MFR$_2$ (2.16 kg, 230° C.) of 3.0 to 7.0 g/10 min and having a tensile modulus of 450 to 850 MPa when measured according to ISO 527-2 at 23° C. temperature with an elongation rate of 1 mm/min on injection moulded test specimens type 1A prepared according to ISO 1873-2 and a Vicat A50 softening temperature of more than 110° C. measured according to DIN EN ISO 306 using test method A50 on an injection moulded test specimen with the dimensions of 4×80×10 mm$^3$ including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), whereby the heterophasic polypropylene composition is obtainable by melt mixing a first heterophasic polypropylene composition (C1) in an amount of 40 to 86 wt.-% with 10 to 30 wt.-% of a second heterophasic polypropylene composition (C2), 0 to 15 wt.-% of an $C_2C_3$, $C_2C_4$, $C_2C_8$ or LDPE impact modifier (H), 1.0 to 4.5 wt.-% of a colour masterbatch (F), 3 to 9 wt.-% of a reactive masterbatch (G) in the presence of 0.5 to 2.0 wt.-% additives (E) with respect to the final heterophasic polypropylene composition, whereby the first heterophasic polypropylene composition (C1) has an MFR$_2$ (2.16 kg, 230° C.) of 2.5 to 6.5 g/10 min and includes a propylene random copolymer matrix phase (A1) and an ethylene-propylene copolymer rubber phase (B1) dispersed within the matrix phase; and whereby the second heterophasic polypropylene composition (C2) has an MFR$_2$ (2.16 kg, 230° C.) of 2.5 to 6.5 g/10 min and includes a propylene homopolymer matrix phase (A2) and an ethylene-propylene copolymer rubber phase (B2) dispersed within the matrix phase; and whereby the reactive masterbatch (G) contains a polypropylene homo- or copolymer having an MFR$_2$ (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the polypropylene masterbatch, and whereby the ratio of weights between C1 and C2 (C1:C2) is 4:3 to 9:1, preferably 1:1 to 8:1, and more preferably 1:1 to 7:1, and whereby the colour masterbatch (F) contains a polyethylene or polypropylene homo- or copolymer in an amount of 40 to 75 wt.-%, 25 to 60 wt.-% pigments with respect to the polypropylene masterbatch.

In a second embodiment, the heterophasic polypropylene composition according to the present invention having an MFR$_2$ (2.16 kg, 230° C.) of 3.0 to 7.0 g/10 min and having a tensile modulus of 450 to 850 MPa when measured according to ISO 527-2 at 23° C. temperature with an elongation rate of 1 mm/min on injection moulded test specimens type 1A prepared according to ISO 1873-2, and a Vicat A50 softening temperature of more than 110° C. measured according to DIN EN ISO 306 using test method A50 on an injection moulded test specimen with the dimensions of 4×80×10 mm$^3$ including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), whereby the heterophasic polypropylene composition is obtainable by melt mixing a first heterophasic polypropylene composition (C1) in an amount of 54 to 79 wt.-% with 20 to 40 wt.-% of an intermediate composition (D) and 1.0 to 4.5 wt.-% of a colour masterbatch (F) in the presence of 0.5 to 2.0 wt.-% additives (E), with respect to the final heterophasic polypropylene composition, whereby the first heterophasic polypropylene composition has an $MFR_2$ (2.16 kg, 230° C.) of 2.5 to 6.5 g/10 min and includes a propylene random copolymer matrix phase (A1) and an ethylene-propylene copolymer rubber phase (B1) dispersed within the matrix phase; and whereby the intermediate composition (D) is obtainable by (s. FIG. 2)

melt mixing a second heterophasic polypropylene (C1) in an amount of 55 to 85 wt.-% with 15 to 30 wt.-% of a reactive masterbatch (G) and 0 to 15 wt.-% of an impact modifier (E) with respect to the intermediate composition (D), whereby the second heterophasic polypropylene (C2) has an $MFR_2$ (2.16 kg, 230° C.) of 2.5 to 6.5 g/10 min and includes a propylene homopolymer matrix phase (A2) and an ethylene-propylene copolymer rubber phase (B2) dispersed within the matrix phase; and whereby the reactive masterbatch contains a polypropylene homo- or copolymer having an $MFR_2$ (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the polypropylene masterbatch, and whereby the ratio of weights between C1 and D (C1:D) is 5:4 to 8:2, preferably 1:1 to 7:2, and more preferably 1:1 to 6:2, and whereby the colour masterbatch (F) contains a polyethylene or polypropylene homo- or copolymer having in an amount of 40 to 75 wt.-%, and 25 to 60 wt.-% of pigments.

In a further preferred aspect, the heterophasic polypropylene composition according to the present invention is melt mixed at a barrel temperature of 180 to 300° C.

The melt mixing is preferably affected at a barrel temperature of 185 to 225° C., preferably in a continuous melt mixing device like a single screw extruder, a co-rotating twin screw extruder or a co-kneader. Most preferably a Coperion ZSK 18 is used.

The barrel temperature preferably is in the range of 185 to 225° C. The screw speed is preferably higher than 300 rpm, more preferably higher than 400 rpm and most preferably higher than 500 rpm. Usually, the screw speed will not be higher than 700 rpm.

Following the melt-mixing step, the resulting polymer melt may be pelletized either in an underwater pelletizer or after solidification of one or more strands in a water bath in a strand pelletizer.

General Process

The heterophasic polypropylene composition according to the present invention is preferably in a multi-stage process in a multi-stage reaction sequence. The bulk polymerisation is preferably performed in a so-called loop reactor. Optionally, the process may also comprise a pre-polymerization step in a manner known in the field and which may precede the first polymerization step. The process is preferably a continuous process.

It is preferred that the propylene polymer matrix (A) of the heterophasic compositions is produced in a bulk reactor and optionally one or more gas phase reactors and afterwards transferred to a gas phase reactor in which the elastomeric copolymer phase (B) is produced in the presence of component (A).

According to the present invention the rubber phase, preferably the ethylene/alpha olefin rubber is prepared as a reactor blend together with the propylene homo- and/or copolymer. For example the production of the propylene homo- and/or copolymer can be effected in a loop reactor and optionally a gas phase reactor, followed by transferring the product into one or more gas phase reactors, where the ethylene/alpha olefin rubber is polymerised.

The catalyst for producing the $1^{st}$ and $2^{nd}$ heterophasic propylene polymer composition may be a Ziegler-Natta catalyst. If a Ziegler-Natta catalyst is used it may be e.g. an inorganic halide (e.g. $MgCl_2$) supported titanium catalyst, together with an aluminium alkyl (e.g. triethylaluminium) cocatalyst. Silanes, e.g. dicyclopentyldimethoxysilane (DCPDMS), cyclohexylmethyl-dimethoxysilane (CHM-DMS) or diethylaminotriethoxysilane, may be used as external donors. Such catalyst systems are described in EP 0 491 566 A1 or in EP 0 591 224 A1. A preferred Ziegler Natta catalyst is of the type BCF20P (proprietary specification of Borealis AG) with diethylaminotriethoxysilane (donor U) or dicyclopentyldimethoxysilane (donor D) as external donor, an Al/Ti ratio (mol/mol) of 200 and an Al/donor ratio (mol/mol) of 20 or less.

The catalyst may also be a single-site catalyst (SSC), preferably an asymmetric catalyst comprising an organometallic compound of a transition metal of group 3 to 10 or the periodic table (IUPAC) or of an actinide or lanthanide. Such a catalyst system is described in EP 10 009 009.1, which is incorporated herein by reference with respect to the description of the catalyst used for polymerising the polypropylene. The catalyst system may further comprise an activator as a cocatalyst, as described in WO 03/051934, which is incorporated herein by reference.

A preferred catalyst system for preparing the heterophasic polypropylene composition of the present invention will be described in detail below.

Preferably, the heterophasic polymer composition is prepared by reactor blending in a multistep process comprising at least one loop reactor and at least one gas phase reactor. A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

Further suitable slurry-gas phase processes are the BORSTAR® process of Borealis for the first heterophasic homo- or copolymer C1 and the Spheripol® process of Basell for the second heterophasic homo- or copolymer C2.

Detailed Description of the Preferable Catalytic System

Preferably, the Ziegler-Natta catalyst used in the present invention comprises a procatalyst component (a), a cocatalyst component (b) and an external electron donor (c).

In a preferred embodiment, the procatalyst component (a) of the catalyst system primarily comprises magnesium, titanium, halogen and an internal electron donor. Internal electron donors control the stereospecific properties and/or improve the activity of the catalyst system. A number of electron donors including ethers, esters, polysilanes, polysiloxanes, and alkoxysilanes are known in the art.

The procatalyst component (a) preferably comprises a transition metal compound. The transition metal compound is more preferably selected from the group consisting of titanium compounds having an oxidation state of 3 or 4, vanadium compounds, zirconium compounds, cobalt compounds, nickel compounds, tungsten compounds and rare earth metal compounds, of which titanium trichloride and titanium tetrachloride are particularly preferred.

One preferred catalyst to be used according to the invention is disclosed in EP 591 224, which presents a method for preparing a procatalyst composition from magnesium dichloride, a titanium compound, a lower alcohol and an ester of phthalic acid containing at least five carbon atoms. According to EP 591 224, a trans-esterification reaction is carried out at an elevated temperature between the lower alcohol and the phthalic acid ester, whereby the ester groups of the lower alcohol and the phthalic ester change places.

Preferably, magnesium dichloride can be used as such or it can be combined with silica, e.g. by absorbing the silica with a solution or slurry containing magnesium dichloride. The lower alcohol used may preferably be methanol or ethanol, particularly ethanol.

The titanium compound used in the preparation of the procatalyst is preferably an organic or inorganic titanium compound in the oxidation state of 3 or 4. Also other transition metal compounds, such as vanadium, zirconium, chromium, molybdenum and tungsten compounds can be mixed with the titanium compound. The titanium compound usually is a halide or oxyhalide, an organic metal halide, or a purely metal organic compound in which only organic ligands have been attached to the transition metal. Particularly preferred are the titanium halides, especially titanium tetrachloride.

The alkoxy group of the employed phthalic acid ester comprises at least five carbon atoms, preferably at least eight carbon atoms. Thus, the ester may be e.g. propylhexyl phthalate, dioctyl phthalate, diisodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the procatalyst composition, transesterifies the catalyst at an elevated temperature. It is preferred to carry out the transesterification at a temperature of 110 to 115° C., preferably 120 to 140° C.

In one preferred embodiment, the Ziegler-Natta catalyst system can be modified by polymerising a vinyl compound in the presence of the catalyst, which vinyl compound has the formula:

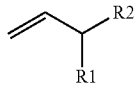

wherein R1 and R2 together form a 5- or 6-membered saturated, unsaturated or aromatic ring or independently represent an alkyl group comprising 1 to 4 carbon atoms, and the modified catalyst is used for the preparation of the polymer composition. The polymerised vinyl compound can act as a nucleating agent. Further details about this modification are provided in EP 1 028 985.

In addition, the catalyst prepared by the method above is preferably employed together with an organometallic cocatalyst (b). The organoaluminium compound is preferably selected from the group consisting of trialkyl aluminium, dialkyl aluminium chloride, alkyl aluminium sesquichloride and triethyl aluminium (TEAL). Most preferred is triethyl aluminium (TEAL).

Preferably the aluminium alkyl/titanium ratio in the catalyst is between 150 and 250 mol/mol. It is further preferred that the cocatalyst to external electron donor ratio (b)/(c) is less than or equal to 50 mol/mol, more preferably less than or equal to 20 mol/mol.

Furthermore, the catalyst prepared by the method above is preferably employed together with an external donor (c). Generally, the external donor has the formula $R_nR'_mSi(R''O)_{4-n-m}$ wherein R and R' can be the same or different and represent a linear, branched or cyclic aliphatic, or aromatic group, R" is methyl or ethyl, n is an integer of 0 to 3, m is an integer of 0 to 3 and n+m is 1 to 3.

In particular, the external donor is selected from the group consisting of cyclohexylmethylmethoxysilane (CHMMS), diisopropyldimethoxysilane, di-isobutyldimethoxysilane, and di-t-butyldimethoxysilane, and dicyclopentyldimethoxysilane (DCPDMS). Most preferred is dicyclopentyldimethoxysilane (DCPDMS).

According to the invention, such catalysts are preferably introduced into the first reactor only. The components of the catalyst can be fed into the reactor separately or simultaneously. Alternatively, the components of the catalyst system can be pre-contacted prior to the reactor. Such pre-contacting can also include a catalyst pre-polymerisation stage prior to feeding into the polymerisation reactor proper. In the pre-polymerisation stage, the catalyst components are preferably contacted for a short period with a monomer before being fed to the reactor.

It is particularly preferred that the catalyst is a nucleated catalyst. Preferably, the catalyst is nucleated with polymeric vinyl cyclohexane (VCH).

The present invention also pertains to a process as described above as to product.

The present invention is further concerned with an article comprising the heterophasic propylene polymer composition according to the present invention.

The present invention is further concerned with an article comprising the heterophasic propylene polymer composition according to the present invention in a manner that the heterophasic propylene polymer composition is directly applied to the epoxy primer of the surface of the article.

The present invention is further concerned with the use of the heterophasic propylene polymer composition according to the present invention for injection moulded articles, adhesive layers, coating of pipes and coating or injection moulding of field joint coating.

The present invention is further concerned with the use of the heterophasic propylene polymer composition according to the present as a combined adhesive and coating layer.

In a further aspect, the present invention is concerned with a process for providing a field joint for a pipe or pipeline comprising the steps of providing at least two pipe segments optionally comprising factory coating, at least partially removing the factory coating (if present) from the pipe segments to form a surface area, welding the pipe segment to form a pipe or pipeline, applying an epoxy layer to the surface areas of said welded pipe or pipeline, curing said epoxy layer, and applying a layer comprising a heterophasic polypropylene polymer composition on top of the epoxy layer, whereby the heterophasic polypropylene polymer composition has a MFR$_2$ (2.16 kg, 230° C.) of 3.0 to 15.0 g/10 min, determined according to ISO 1133, a Vicat A50 softening temperature of more than 110° C. measured according to DIN EN ISO 306 at 10 N on an injection moulded test specimen with the dimensions of 80×10×4 mm$^3$, a heat rate of 50° C./h, a fraction soluble in p-xylene at 23° C. (XCS fraction), a fraction insoluble in p-xylene at 23° C. (XCU fraction), a tensile modulus of 450 to 850 MPa when measured according to ISO 527-2 at 23° C. temperature with an elongation rate of 1 mm/min on injection moulded test specimens type 1A prepared according to ISO 1873-2, and a normalized maleic anhydride index $I_{MA}$ equal to or less than 0.036 µm$^{-1}$ determined by IR absorbance measurements being normalised to the measured film thickness (d) in units of microns, whereby the heterophasic polypropylene polymer composition is the outermost layer of the pipe or pipeline.

In a further aspect of the present invention the process providing a field joint for a pipe or pipeline further comprises the optional step of heating the surface areas of the welded steel pipe segments.

In yet another aspect of the present invention the process providing a field joint for a pipe or pipeline further comprises the step of curing said epoxy layer by methods known in the prior art, preferably by heating. The heat can also originate from the optional prior heating process.

In another aspect of the present invention the outermost layer of the process providing a field joint for a pipe or pipeline comprises an heterophasic polypropylene polymer composition, which has a $MFR_2$ measured according to ISO 1133 (2.16 kg, 230° C.) of 3.0 to 15.0 g/10 min, preferably 3.0 to 7.0 g/10 min, more preferably of 3.2 to 4.8 g/10 min and most preferably of 3.9 to 4.7 g/10 min.

In a further aspect of the present invention the pipe or pipeline and thus the pipe segments of the process providing a field joint for a pipe or pipeline preferably are made of steel and more preferably are made of steel and have a factory coating.

A field joint according to the present invention has the advantage over the prior art that it combines the properties of the adhesive layer, which is normally placed between the epoxy layer and the outermost layer, with the properties of the outermost layer. Thus, it reduces costs, count of production steps, and weight.

In yet another aspect of the invention the outermost layer of the process providing a field joint for a pipe or pipeline comprises a heterophasic polypropylene composition according to the present invention having an $MFR_2$ (2.16 kg, 230° C.) of 3.0 to 7.0 g/10 min and having a tensile modulus of 450 to 850 MPa when measured according to ISO 527-2 at 23° C. temperature with an elongation rate of 1 mm/min on injection moulded test specimens type 1A prepared according to ISO 1873-2 and a Vicat A50 softening temperature of more than 110° C. measured according to DIN EN ISO 306 using test method A50 on an injection moulded test specimen with the dimensions of 4×80×10 mm³ including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), whereby the heterophasic polypropylene composition is obtainable by melt mixing a first heterophasic polypropylene composition (C1) in an amount of 40 to 86 wt.-% with 10 to 30 wt.-% of a second heterophasic polypropylene composition (C2), 0 to 15 wt.-% of an $C_2C_3$, $C_2C_4$, $C_2C_8$ or LDPE impact modifier (H), 1.0 to 4.5 wt.-% of a colour masterbatch (F), 3 to 9 wt.-% of a reactive masterbatch (G) in the presence of 0.5 to 2.0 wt.-% additives (E) with respect to the final heterophasic polypropylene composition, whereby the first heterophasic polypropylene composition (C1) has an $MFR_2$ (2.16 kg, 230° C.) of 2.5 to 6.5 g/10 min and includes a propylene random copolymer matrix phase (A1) and an ethylene-propylene copolymer rubber phase (B1) dispersed within the matrix phase; and whereby the second heterophasic polypropylene composition (C2) has an $MFR_2$ (2.16 kg, 230° C.) of 2.5 to 6.5 g/10 min and includes a propylene homopolymer matrix phase (A2) and an ethylene-propylene copolymer rubber phase (B2) dispersed within the matrix phase; and whereby the reactive masterbatch (G) contains a polypropylene homo- or copolymer having an $MFR_2$ (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the polypropylene masterbatch, and whereby the ratio of weights between C1 and C2 (C1:C2) is 4:3 to 9:1, preferably 1:1 to 8:1, and more preferably 1:1 to 7:1, and whereby the colour masterbatch (F) contains a polyethylene or polypropylene homo- or copolymer in an amount of 40 to 75 wt.-%, 25 to 60 wt.-% pigments with respect to the polypropylene masterbatch.

In yet another aspect of the invention the outermost layer of the process providing a field joint for a pipe or pipeline comprises heterophasic polypropylene composition according to the present invention having an $MFR_2$ (2.16 kg, 230° C.) of 3.0 to 7.0 g/10 min and having a tensile modulus of 450 to 850 MPa when measured according to ISO 527-2 at 23° C. temperature with an elongation rate of 1 mm/min on injection moulded test specimens type 1A prepared according to ISO 1873-2, and a Vicat A50 softening temperature of more than 110° C. measured according to DIN EN ISO 306 using test method A50 on an injection moulded test specimen with the dimensions of 4×80×10 mm³ including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), whereby the heterophasic polypropylene composition is obtainable by melt mixing a first heterophasic polypropylene composition (C1) in an amount of 54 to 79 wt.-% with 20 to 40 wt.-% of an intermediate composition (D) and 1.0 to 4.5 wt.-% of a colour masterbatch (F) in the presence of 0.5 to 2.0 wt.-% additives (E), with respect to the final heterophasic polypropylene composition, whereby the first heterophasic polypropylene composition has an $MFR_2$ (2.16 kg, 230° C.) of 2.5 to 6.5 g/10 min and includes a propylene random copolymer matrix phase (A1) and an ethylene-propylene copolymer rubber phase (B1) dispersed within the matrix phase; and whereby the intermediate composition (D) is obtainable by (s. FIG. 2)

melt mixing a second heterophasic polypropylene (C1) in an amount of 55 to 85 wt.-% with 15 to 30 wt.-% of a reactive masterbatch (G) and 0 to 15 wt.-% of an impact modifier (E) with respect to the intermediate composition (D), whereby the second heterophasic polypropylene (C2) has an $MFR_2$ (2.16 kg, 230° C.) of 2.5 to 6.5 g/10 min and includes a propylene homopolymer matrix phase (A2) and an ethylene-propylene copolymer rubber phase (B2) dispersed within the matrix phase; and whereby the reactive masterbatch contains a polypropylene homo- or copolymer having an $MFR_2$ (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the polypropylene masterbatch, and whereby the ratio of weights between C1 and D (C1:D) is 5:4 to 8:2, preferably 1:1 to 7:2, and more preferably 1:1 to 6:2, and whereby the colour masterbatch (F) contains a polyethylene or polypropylene homo- or copolymer having in an amount of 40 to 75 wt.-%, and 25 to 60 wt.-% of pigments.

All preferred embodiments as to the heterophasic polypropylene polymer composition described above within this specification and the claims shall also apply to the process for providing a field joint for a pipe or pipeline.

EXAMPLES

1. Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR of polypropylene is determined at a temperature of 230° C. and a load of 2.16 kg. It is also designated in this application as "$MFR_2$"

b) Vicat A50 Softening Temperature

According to ISO 306, method A50, a flat-ended needle loaded with a mass of 10 N is placed in direct contact with an injection moulded test specimen with the dimensions of 80×10×4 mm$^3$. The specimen and needle are heated at 50° C./h. The temperature at which the needle has penetrated to a depth of 1 mm is recorded as the Vicat A50 softening temperature.

The test specimens were prepared by injection moulding in line with ISO 1873-2. The melt temperature was 230° C. and the mould temperature was 40° C.

c) Intrinsic Viscosity

The intrinsic viscosity (IV) value increases with the molecular weight of a polymer. The intrinsic viscosity of the XCU and the XCS fraction is measured in decalin at 135° C. according to DIN EN ISO 1628-1 and -3.

d) Xylene Cold Soluble Fraction

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter). The fraction insoluble in p-xylene at 25° C. (XCU) is then equal to 100%−XCS %.

The fraction insoluble in p-xylene at 23° C. (XCU) is then equal to 100%−XCS %.

e) Comonomer Content by FTIR Spectroscopy

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt.-%) via:

$$N = k_1(A/R) + k_2$$

wherein A is the maximum absorbance defined of the comonomer band, R the maximum absorbance defined as peak height of the reference peak and with $k_1$ and $k_2$ the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

f) Melting and Crystallisation Temperature

The melting and crystallisation temperature $T_m$ and $T_c$ are determined according to ISO 11357-1, -2 and -3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature $T_c$ being determined in the cooling step and the $T_m$ melting temperature being determined in the second heating step.

g) MAH Content as Normalized Maleic Anhydride Index—Quantification of the Amount of Maleic Anhydride by IR Spectroscopy Quantitative Fourier-transform infrared (FTIR) spectroscopy was used to quantify the amount of maleic anhydride present in the polymer composition being denoted MAH index.

All samples were compression moulded at 190° C. into films with a thickness between 265 to 280 µm. Infrared spectra were recorded in standard transmission mode on a Perkin-Elmer Spectrum One FTIR spectrometer using 16 scans and a spectral resolution of 2 cm$^{-1}$. Spectra ware processed using Norton-Bear strong apodisation and transformed to absorption prior to quantification.

The presence of maleic anhydride was indicated by the presence of the multiple absorbance bands between 1790 and 1710 cm$^{-1}$, specifically the strong absorption at 1742 cm$^{-1}$, assigned to the carbonyl stretching mode of the various free and grafted maleic anhydride species.

The amount of maleic anhydride was quantified as the maleic anhydride index ($I_{MA}$) determined from the absorption of the carbonyl stretching bands ($A_{MA}$) and normalised to the measured film thickness (d) in units of microns according to:

$$I_{MA} = A_{MA}/d$$

The absorption of the carbonyl bands ($A_{MA}$) was quantified as the combined area of the bands using a tangential baseline set between 1810 and 1664 cm$^{-1}$.

h) Tensile Properties

Tensile properties at 23° C. were determined according to ISO 527-2 on 1 A injection moulded test specimen. The measurement was conducted at 23° C. temperature with a cross head speed of 1 mm/min for determining tensile modulus and 50 mm/min for determining tensile strength, elongation at break, and elongation at yield.

Tensile properties at −20° C. were determined according to ISO 527-2 on 5 A injection moulded test specimen with a crosshead speed of 1 mm/min to determine the tensile modulus and cross head speed of 20 mm/min used to determine elongation at break as well as elongation at yield.

The specimens were injection moulded according to ISO 1873-2 i) Peel Strength

Coating experiments were conducted using steel pipes. First a coating of an epoxy primer was applied, by spray coating (rotating steel pipe, 10 m/min, 180-200° C., 100 µm coating thickness). Thereafter an adhesive layer was coextruded with a polypropylene outer layer at temperatures between 220 and 250° C. (layer thickness: adhesive layer 250 µm, outer layer 3.8 mm). Using a silicone pressure roller the coextruded layers were pressed onto the steel pipe in order to increase the adhesion. The peel strength was measured according to ISO 21809-1 Annex C, using an Instron tensile testing machine at 23 and 80° C. The peel strength was determined by pulling a pull stripe away from the rotating pipe at a pulling speed of 10 mm/min. The speed of the rotating pipe is adjusted to allow the pull stripe to stay at the same position relative to the rotating pipe. The width of the pull stripe has been 30 mm.

j) Notched Charpy Impact Strength

Charpy impact strength was determined according to ISO 179-1eA:2000 on V-notched samples of 80×10×4 mm$^3$ at 23° C. and −20° C. The test specimens were prepared by injection moulding in line with ISO 1873-2. The melt temperature was 230° C. and the mould temperature was 40° C.

k) Shore D

Shore D hardness was measured after an indentation time of 15 s according to ISO 868 on 80×40×10 mm$^3$ specimens prepared by injection moulding according to ISO 1873-2. The melt temperature was 230° C. and the mould temperature was 40° C.

2. Compositions a) 1st Heterophasic Homo- or Copolymer (C1)

The first heterophasic homo- or copolymers C1 of the Inventive Examples 1-8 have been polymerized using a catalyst prepared according to Example 8 of WO 2004/029112, except that diethylaluminium chloride was used as an aluminium compound instead of triethylaluminium.

TABLE 1

| Fraction | Value | Unit | C1 | C2 |
|---|---|---|---|---|
| Total | MFR$_2$ (230° C., 2.16 kg) | [g/10 min] | 3.9 | 4.0 |
| | Comonomer content | [wt.-%]$^a$ | 8.0 | 12.8 |
| XCS | Weight percent | [wt.-%]$^a$ | 23 | 19-21 |
| | Intrinsic Viscosity | [ml/g] | 1.3 | |
| | Comonomer content | [wt.-%]$^b$ | 25 | 36 |

$^a$Weight percent with regard to the weight of the total composition.
$^b$Weight percent with regard to the weight of the XCS fraction.

This catalyst is a solid catalyst of spherical particles with compact structure and low surface area of the particles. Further, this catalyst is featured by uniform distribution of catalytically active sites through the catalyst particles. The catalyst is prepared by an emulsion-solidification method. The dispersed phase in the form of liquid droplets of the emulsion forms the catalyst part, which is transformed to solid catalyst particles during the solidification step. In particular, the solid catalyst component is prepared by a process comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one four-valent Group 4 metal at a temperature greater than 10° C. and less than 60° C. to produce an emulsion of a denser, TiCl$_4$/toluene-insoluble, oil dispersed phase having, Group 4 metal/Mg mol ratio 0.1 to 10 in an oil disperse phase having Group 4 metal/Mg mol ratio 10 to 100; agitating the emulsion, optionally in the presence of an emulsion stabilizer and/or a turbulence minimizing agent, in order to maintain the droplets of said dispersed phase within an average size range of 5 to 200 μm. The catalyst particles are obtained after solidifying said particles of the dispersed phase by heating. In said process an aluminium alkyl compound of the formula AlR$_{3-n}$X$_n$, where R is an alkyl and/or an alkoxy group of 1 to 20, preferably of 1 to 10 carbon atoms, X is a halogen and n is 0, 1, 2 or 3, is added and brought into contact with the droplets of the dispersed phase of the agitated emulsion or during the washing step of the solidified particles before recovering the final solid particles.

Properties of the first heterophasic homo- or copolymer C1 can be obtained from table 1.

b) 2nd Heterophasic Homo- or Copolymer (C2)

The first heterophasic homo- or copolymers C2 of the Inventive Examples 1-8 have been polymerized using a catalyst prepared obtainable by the following process (also described in EP 491 566, EP 591 224 and EP 586 390).

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried.

Optionally, the catalyst may be prepolymerised with vinylcyclohexane as follows. Triethylaluminium (TEAL), dicyclopentyldimethoxysilane (DCPDMS) as donor (Do), catalyst as produced above and vinylcyclohexane (VCH) were added into oil, e.g. Technol 68, provided in amounts so that Al/Ti was 3 to 4 mol/mol, Al/Do was as well 3 to 4 mol/mol, and weight ratio of VCH/solid catalyst was 1/1. The mixture was heated to 60 to 65° C. and allowed to react until the content of the unreacted vinylcyclohexane in the reaction mixture was less than 1000 ppm. Catalyst concentration in the final oil-catalyst slurry was 10 to 20 wt.-%.

c) Reactive Masterbatch (F)

The reactive masterbatch had a MFR$_2$ of 55 g/10 min. It contained 0.7 wt.-% maleic anhydride and 0.1 wt.-% peroxide (Luperox 101 from Arkema). The underlying base polymer before anhydride modification (yielding the reactive masterbatch) had a MFR$_2$ of about 1.3 g/10 min; rubber content: 13%, comonomer content of rubber: 40% as described in EP 1 911 825 B2.

d) Colour Masterbatch (G)

Colour masterbatch 1 comprises 50 wt.-% of the commercially available BorePure™ RE216CF of Borealis and 50 wt.-% of TiO$_2$.

Colour masterbatch 2 comprises 67.4 wt.-% of LDPE LE7190 (CAS 9002-88-4), 6 wt.-% of Ultramarine Blue (CAS 57455-37-5), 3.3 wt.-% of Eoplene Blue (CAS 147-14-8), 1.15 wt.-% of Epolene Green (CAS 1328-53-6), 22 wt.-% of TiO$_2$ and 0.15 wt.-% of Irganox 1076 (CAS 2082-79-3).

Colour masterbatch 3 comprises 50 wt.-% of the commercially available BorePure™ RE216CF of Borealis, 35 wt.-% of Ultramarine Blue (CAS 57455-37-5), and 15 wt.-% of TiO$_2$.

e) Melt Mixing Conditions

TABLE 2

| Value | Unit | CE4 | IE5 | IE1, IE2, IE7; all other IEs |
|---|---|---|---|---|
| $MFR_2$ (230° C., 2.16 kg) | [g/10 min] | 3.2 | 3.1 | 4.1 |
| T1(feed zone) | [° C.] | 190 | 190 | 190 |
| T2(kneading zone) | [° C.] | 220-230 | 220-230 | 220-230 |
| T3(die zone) | [° C.] | 210 | 210 | 210 |
| Screw speed | [rpm] | 300 | 300 | 300 |

TABLE 3

| | | | | CE1 | CE2 | CE3 | CE4 | CE5 | CE6 | IE1 | IE2 | IE3 | IE4 | IE5 | IE6 | IE7 | IE8 |
|---|---|---|---|---|---|---|---|---|---|---|---|---|---|---|---|---|---|
| Process values | Process | | 1 step (claim 9) | X | X | X | X | X | X | X | X | X | X | X | X | X | X |
| | | | 2 step (claim 10) | | | | | | | | | | | | | | |
| | Polymer[a] | C1 | Amount 1 step [wt %][b] | | | | | | | ~65 | ~64 | ~64 | ~65 | ~65 | ~65 | ~65 | ~65 |
| | | | Amount 2 step [wt %][c] | | | | | | | | | | | | | | |
| | | | MFR$_2$ [g/10 min][c] | 4.0 | 5.0 | 5.0 | 3.9 | 3.9 | 3.9 | 3.9 | 3.9 | 3.9 | 3.9 | 3.9 | 3.9 | 3.9 | 3.9 |
| | | | XCS [wt %][c] | 19-21 | 15.5 | 15.5 | 23 | 23 | 23 | 23 | 23 | 23 | 23 | 23 | 23 | 23 | 23 |
| | | | Comonomer [wt %][c] | 12.8 | 9.8 | 9.8 | 8 | 8 | 8 | 8 | 8 | 8 | 8 | 8 | 8 | 8 | 8 |
| | | | Comonomer/XCS [wt %][c] | 36 | | | 25 | 25 | 25 | 25 | 25 | 25 | 25 | 25 | 25 | 25 | 25 |
| | Polymer[a] | C2 | IV/XCS [dl/g] | | | | 1.3 | 1.3 | 1.3 | 1.3 | 1.3 | 1.3 | 1.3 | 1.3 | 1.3 | 1.3 | 1.3 |
| | | | Amount 1 step [wt %][b] | | | | | | | 21 | 25 | 25 | 21 | | | | |
| | | | Amount 2 step [wt %][c] | | | | | | | | | | | 68 | 68 | 68 | 68 |
| | | | MFR$_2$ [g/10 min][c] | | | | | | | 4.0 | 4.0 | 4.0 | 4.0 | | | | |
| | | | XCS [wt %][c] | | | | | | | 19-21 | 19-21 | 19-21 | 19-21 | | | | |
| | | | Comonomer [wt %][c] | | | | | | | 12.8 | 12.8 | 12.8 | 12.8 | | | | |
| | | | Comonomer/XCS [wt %][c] | | | | | | | 36 | 36 | 36 | 36 | | | | |
| Intermediate | D | BB122E-LT [wt %][b] | | — | 0.006 | 0.60 | 0.60 | 0.60 | 0.60 | 0.50 | 0.50 | 0.50 | 0.50 | 0.36 | 0.37 | 0.40 | 0.40 |
| Additives | E | Irganox 1010 [wt %][c] | | — | 0.004 | 0.40 | 0.40 | 0.40 | 0.40 | 0.35 | 0.35 | 0.35 | 0.35 | 0.35 | 0.37 | 0.40 | 0.40 |
| | | Irgafos 168 | | — | 0.004 | 0.40 | 0.40 | 0.40 | 0.40 | 0.40 | 0.40 | 0.40 | 0.40 | 0.16 | 0.16 | 0.16 | 0.16 |
| | | DSTPD | | — | 0.10 | 0.10 | 0.10 | 0.10 | 0.10 | 0.10 | 0.10 | 0.10 | 0.10 | 0.11 | 0.13 | 0.11 | 0.11 |
| | | Tinuvin 770 | | — | 0.114 | 1.5 | 1.5 | 1.5 | 1.5 | 1.35 | 1.35 | 1.35 | 1.35 | 0.96 | 1.03 | 1.07 | 1.07 |
| | | Total | | — | 2 | 2 | 2 | 2 | 2 | 4 | 4 | 4 | 4 | 4 | 4 | 4 | 4 |
| Colour MB | F | CMB 1 [wt %][c] | | — | — | — | — | — | — | 6 | 6 | 6 | 6 | — | — | — | — |
| | | CMB 2 | | — | — | — | — | — | — | — | — | — | — | — | — | — | — |
| | | CMB 3 | | — | — | — | — | — | — | — | — | — | — | — | — | — | — |
| Reactive MB Total | G | [wt %][b] | | — | 10 | 17 | 10 | 10 | 10 | — | — | — | — | — | — | — | — |
| Reactive MB in D | G | [wt %][c] | | — | 10 | 17 | 10 | 10 | 10 | — | — | — | — | — | — | — | — |
| Impact modifier Total | H | Engage 8200 [wt %][b] | | — | — | — | — | — | — | 3 | — | — | 3 | — | — | — | — |
| | | FA7220 | | — | — | — | — | — | — | — | — | — | — | — | — | — | — |
| Impact modifier in D | H | Engage 8200 [wt %][c] | | — | — | — | — | — | — | — | — | — | — | 10 | 10 | 10 | 10 |
| | | FA7220 | | — | — | — | — | — | — | — | — | — | — | — | — | — | — |
| Analysis values of the final composition | | MFR$_2$ [g/10 min] | (calculated) | 8.3 | 6.1 | 4.8 | 4.4 | 4.4 | 4.2 | 4 | 4.2 | 4.1 | | 4.2 | 4.3 | 4.3 | 4.4 |
| | | XCS [wt %][b] | (measured) | 18 | 24 | 31 | 19 | 28 | | 23 | 20 | 20 | 22 | 22 | 23 | 22 | 23 |
| | | Max. MAH I$_{M4}$, FTIR [µm$^{-1}$][b] | (measured) | 0.15 | 0.07 | 0.07 | 0.07 | 0.07 | 0.07 | 0.04 | 0.04 | | | 0.05 | 0.05 | 0.05 | 0.05 |
| | | Free MAH [wt %][b] | | 0.0509 | | 0.0389 | 0.0335 | 0.0351 | | | | 0.0325 | | 0.0316 | 0.0312 | 0.0350 | |
| | | Comonomer [wt %][b] | | 0.15 | | 0.03 | 0.02 | 0.02 | | | | | | 0.02 | 0.02 | | |
| | | Comonomer/XCU [wt %][c] | | 9.7 | | 21.3 | 7.6 | 15.9 | | | 9.4 | | | 11.2 | 4.5 | | |

TABLE 3-continued

| | | CE1 | CE2 | CE3 | CE4 | CE5 | CE6 | IE1 | IE2 | IE3 | IE4 | IE5 | IE6 | IE7 | IE8 |
|---|---|---|---|---|---|---|---|---|---|---|---|---|---|---|---|
| Comonomer/XCS | [wt %][c] | | | 63 | 29 | 51 | n/a | 45 | 33 | | | | 40 | | |
| Tensile Mod. 23° C. | [MPa] | 1218 | 1039 | 900 | 662 | 603 | 549 | 744 | 798 | 784 | 736 | 755 | 690 | 805 | 704 |
| Stress, yield | [MPa] | 27 | 23 | 20 | 20 | 17 | 18 | 20 | 21 | 21 | 19 | 20 | 20 | 20 | 20 |
| Elongation at yield | [%] | 1A | 10 | 9 | 14 | 15 | 15 | 13 | 13 | 12 | 13 | 13 | 14 | 13 | 14 |
| Stress, break | [MPa] | 11 | 18 | 6 | 24 | 24 | 26 | 25 | 26 | 25 | 26 | 24 | 25 | 27 | 25 |
| Elongation at break | [%] | 85 | 430 | 222 | 530 | 612 | 642 | 552 | 538 | 514 | 570 | 512 | 537 | 590 | 549 |
| Tensile Mod. −20° C. | [MPa] | 3020 | 2454 | 2162 | 3108 | 2204 | | 2887 | 3050 | | | 3070 | 2202 | 2865 | 2858 |
| Stress, yield | [MPa] | 42 | 43 | 40 | 47 | 42 | | 44 | 45 | | | 45 | 45 | 45 | 45 |
| Elongation at yield | [%] | 3 | 6 | 6 | 10 | 13 | | 8 | 7 | | | 9 | 10 | 9 | 9 |
| Stress, break | [MPa] | 35 | 55 | 51 | 37 | 51 | | 46 | 40 | | | 39 | 51 | 49 | 50 |
| Elongation at break | [%] | 37 | 287 | 267 | 186 | 267 | | 219 | 188 | | | 200 | 232 | 225 | 226 |
| Charpy at 23° C. | [J/m²] | 15 | 12 | 50 | 12 | 49 | 18 | 13 | 12 | | | 12 | 12 | 21 | 12 |
| Charpy at 0° C. | [J/m²] | 8 | | 10 | | 9 | 7 | 8 | 4 | | | 6 | | 8 | 6 |
| Charpy at −20° C. | [J/m²] | 6 | 4 | 8 | 2 | 3 | 2 | 4 | 4 | | | 3 | 3 | 4 | 2 |
| Shore D | [Shore] | 59 | 58 | 58 | 56 | 53 | 55 | 56 | 56 | 56 | | 57 | | 56 | 55 |
| Vicat A | [° C.] | 157 | 140 | 133 | 121 | 114 | 115 | 124 | 128 | | | 128 | 123 | 119 | 124 |
| Tm | [° C.] | 164 | 163 | 165 | 157 | 157 | | 162 | 162 | 158 | 158 | 162 | 163 | 163 | 162 |
| Tc | [° C.] | | 116 | 117 | 105 | 105 | | 114 | 114 | 121 | 120 | 112 | 111 | 120 | 111 |
| Peel strength 23° C. | [N/mm] | 1-100 | | | 575 | 290 | | | | | | | | | |
| Peel strength 80° C. | [N/mm] | 5A | | | 208 | 115 | | | | | | | | | |

[a]All used polymers are heterophasic and comprise a propylene random copolymer matrix A1 and a therein dispersed ethylene-propylene copolymer rubber phase B1.
[b]Weight percent with respect to the weight of the total composition.
[c]Weight percent with respect to the weight of the containing fraction, e.g. masterbatch, XCS or XCU fraction, intermediate D.

TABLE 3-1

| | | | | | IE1 | IE2 | IE3 | IE4 | IE5 | IE6 | IE7 | IE8 |
|---|---|---|---|---|---|---|---|---|---|---|---|---|
| Process values | Process | | | 1 step (claim 9) | X | X | X | X | | | | |
| | | | | 2 step (claim 10) | | | | | X | X | X | X |
| | Polymer[a] | C1 | [wt %][b] | Amount 1 step | ~65 | ~64 | ~64 | ~65 | | | | |
| | | | | Amount 2 step | | | | | ~65 | ~65 | ~65 | ~65 |
| | | | [g/10 min] | MFR$_2$ | 3.9 | 3.9 | 3.9 | 3.9 | 3.9 | 3.9 | 3.9 | 3.9 |
| | | | [wt %][c] | XCS | 23 | 23 | 23 | 23 | 23 | 23 | 23 | 23 |
| | | | [wt %][c] | Comonomer | 8 | 8 | 8 | 8 | 8 | 8 | 8 | 8 |
| | | | [wt %][c] | Comonomer/XCS | 25 | 25 | 25 | 25 | 25 | 25 | 25 | 25 |
| | | | [dl/g] | IV/XCS | 1.3 | 1.3 | 1.3 | 1.3 | 1.3 | 1.3 | 1.3 | 1.3 |
| | Polymer[a] | C2 | [wt %][b] | Amount 1 step | 21 | 25 | 25 | 21 | | | | |
| | | | [wt %][c] | Amount 2 step | | | | | 68 | 68 | 68 | 68 |
| | | | [g/10 min] | MFR$_2$ | 4.0 | 4.0 | 4.0 | 4.0 | | | | |
| | | | [wt %][c] | XCS | 19-21 | 19-21 | 19-21 | 19-21 | | | | |
| | | | [wt %][c] | Comonomer | 12.8 | 12.8 | 12.8 | 12.8 | | | | |
| | | | [wt %][c] | Comonomer/XCS | 36 | 36 | 36 | 36 | | | | |
| | Intermediate | D | [wt %][b] | BB122E-LT | — | — | — | — | 30 | 30 | 30 | 30 |
| | Additives | E | [wt %][c] | Irganox 1010 | 0.50 | 0.50 | 0.50 | 0.50 | 0.36 | 0.37 | 0.40 | 0.40 |
| | | | | Irgafos 168 | 0.35 | 0.35 | 0.35 | 0.35 | 0.35 | 0.37 | 0.40 | 0.40 |
| | | | | DSTPD | 0.40 | 0.40 | 0.40 | 0.40 | 0.16 | 0.16 | 0.16 | 0.16 |
| | | | | Tinuvin 770 | 0.10 | 0.10 | 0.10 | 0.10 | 0.11 | 0.13 | 0.11 | 0.11 |
| | | | | Total | 1.35 | 1.35 | 1.35 | 1.35 | 0.96 | 1.03 | 1.07 | 1.07 |
| | Colour M | F | [wt %][c] | CMB 1 | 4 | 4 | — | — | 4 | 4 | — | — |
| | | | | CMB 2 | — | — | 4 | 4 | — | — | 4 | — |
| | | | | CMB 3 | — | — | — | — | — | — | — | 4 |
| | Reactive MB Total | G | [wt %][b] | | 6 | 6 | 6 | 6 | — | — | — | — |
| | Reactive MB in D | G | [wt %][c] | | — | — | — | — | 22 | 22 | 22 | 22 |
| | Impact modifier Total | H | [wt %][b] | Engage 8200 | 3 | — | — | 3 | | | | |
| | | | | FA7220 | — | — | — | — | | | | |
| | Impact modifier in D | H | [wt %][c] | Engage 8200 | — | — | — | — | 10 | 10 | 10 | 10 |
| | | | | FA7220 | — | — | — | — | — | — | — | — |

[a]All used polymers are heterophasic and comprise a propylene random copolymer matrix A1 and a therein dispersed ethylene-propylene copolymer rubber phase B1.
[b]Weight percent with respect to the weight of the total composition.
[c]Weight percent with respect to the weight of the containing fraction, e.g. masterbatch, XCS or XCU fraction, intermediate D.

TABLE 3-2

| | | | | IE1 | IE2 | IE3 | IE4 | IE5 | IE6 | IE7 | IE8 |
|---|---|---|---|---|---|---|---|---|---|---|---|
| Analysis values of the final composition | MFR$_2$ | [g/10 min] | | 4 | 4.2 | 4.1 | | 4.2 | 4.3 | 4.3 | 4.4 |
| | XCS | [wt %][b] | | 23 | 20 | 20 | 22 | 22 | 23 | 22 | 23 |
| | Max. MAH | [wt %][b] | (calculated) | 0.04 | 0.04 | | | 0.05 | 0.05 | 0.05 | 0.05 |
| | I$_{MA}$, FTIR | [µm$^{-1}$][b] | (measured) | | | 0.0325 | | 0.0316 | 0.0312 | 0.0350 | |
| | Free MAH | [wt %][b] | (measured) | | | | | 0.02 | 0.02 | | |
| | Comonomer | [wt %][b] | | | 9.4 | | | 11.2 | | | |
| | Comonomer/XCU | [wt %][c] | | | | | | | 4.5 | | |
| | Comonomer/XCS | [wt %][c] | | 45 | 33 | | | 40 | | | |
| | Tensile Mod. 23° C. | [MPa] | | 744 | 798 | 784 | 736 | 755 | 690 | 805 | 704 |
| | Stress, yield | [MPa] | | 20 | 21 | 21 | 19 | 20 | 20 | 20 | 20 |
| | Elongation at yield | [%] | 1A | 13 | 13 | 12 | 13 | 13 | 14 | 13 | 14 |
| | Stress, break | [MPa] | | 25 | 26 | 25 | 26 | 24 | 25 | 27 | 25 |
| | Elongation at break | [%] | | 552 | 538 | 514 | 570 | 512 | 537 | 590 | 549 |
| | Tensile Mod. −20° C. | [MPa] | | 2887 | 3050 | | | 3070 | 2202 | 2865 | 2858 |
| | Stress, yield | [MPa] | | 44 | 45 | | | 45 | 45 | 45 | 45 |
| | Elongation at yield | [%] | 5A | 8 | 7 | | | 9 | 10 | 9 | 9 |
| | Stress, break | [MPa] | | 46 | 40 | | | 39 | 51 | 49 | 50 |
| | Elongation at break | [%] | | 219 | 188 | | | 200 | 232 | 225 | 226 |
| | Charpy at 23° C. | [J/m$^2$] | | 13 | 12 | | | 12 | 12 | 21 | 12 |
| | Charpy at 0° C. | [J/m$^2$] | | 8 | 4 | | | 6 | | 8 | 6 |
| | Charpy at −20° C. | [J/m$^2$] | | 4 | 4 | | | 3 | 3 | 4 | 2 |
| | Shore D | [Shore] | 1-100 | 56 | 56 | 56 | | 57 | | 56 | 55 |
| | Vicat A | [° C.] | | 124 | 128 | | | 128 | 123 | 119 | 124 |
| | Tm | [° C.] | | 162 | 162 | 158 | 158 | 162 | 163 | 163 | 162 |
| | Tc | [° C.] | | 114 | 114 | 121 | 120 | 112 | 111 | 120 | 111 |
| | Peel strength 23° C. | [N/mm] | | | | | | | | | |
| | Peel strength 80° C. | [N/mm] | | | | | | | | | |

[a]All used polymers are heterophasic and comprise a propylene random copolymer matrix A1 and a therein dispersed ethylene-propylene copolymer rubber phase B1.
[b]Weight percent with respect to the weight of the total composition.
[c]Weight percent with respect to the weight of the containing fraction, e.g. masterbatch, XCS or XCU fraction, intermediate D.

TABLE 3-3

| | | | | | CE1 | CE2 | CE3 | CE4 | CE5 | CE6 |
|---|---|---|---|---|---|---|---|---|---|---|
| Process values | Process | | | 1 step (claim 9) | X | X | X | X | X | X |
| | | | | 2 step (claim 10) | | | | | | |
| | Polymer[a] | C1 | [wt %][b] | Amount 1 step | | | | | | |
| | | | | Amount 2 step | | | | | | |
| | | | [g/10 min] | MFR$_2$ | 4.0 | 5.0 | 5.0 | 3.9 | 3.9 | 3.9 |
| | | | [wt %][c] | XCS | 19-21 | 15.5 | 15.5 | 23 | 23 | 23 |
| | | | [wt %][c] | Comonomer | 12.8 | 9.8 | 9.8 | 8 | 8 | 8 |
| | | | [wt %][c] | Comonomer/XCS | 36 | | | 25 | 25 | 25 |
| | | | [dl/g] | IV/XCS | | | | 1.3 | 1.3 | 1.3 |
| | Polymer[a] | C2 | [wt %][b] | Amount 1 step | | | | | | |
| | | | [wt %][c] | Amount 2 step | | | | | | |
| | | | [g/10 min] | MFR$_2$ | | | | | | |
| | | | [wt %][c] | XCS | | | | | | |
| | | | [wt %][c] | Comonomer | | | | | | |
| | | | [wt %][c] | Comonomer/XCS | | | | | | |
| | Intermediate | D | [wt %][b] | BB122E-LT | | | | — | — | — |
| | Additives | E | [wt %][b] | Irganox 1010 | — | 0.006 | 0.60 | 0.60 | 0.60 | 0.60 |
| | | | | Irgafos 168 | — | 0.004 | 0.40 | 0.40 | 0.40 | 0.40 |
| | | | | DSTPD | — | 0.004 | 0.40 | 0.40 | 0.40 | 0.40 |
| | | | | Tinuvin 770 | — | 0.10 | 0.10 | 0.10 | 0.10 | 0.10 |
| | | | | Total | — | 0.114 | 1.5 | 1.5 | 1.5 | 1.5 |
| | Colour M | F | [wt %][c] | CMB 1 | — | 2 | 2 | 2 | 2 | 2 |
| | | | | CMB 2 | — | — | — | — | — | — |
| | | | | CMB 3 | — | — | — | — | — | — |
| | Reactive MB Total | G | [wt %][b] | | 22 | 10 | 17 | 10 | 10 | 10 |
| | Reactive MB in D | G | [wt %][c] | | — | — | — | — | — | — |
| | Impact modifier Total | H | [wt %][b] | Engage 8200 | — | 10 | 17 | — | 10 | — |
| | | | | FA7220 | — | — | — | — | — | 10 |
| | Impact modifier in D | H | [wt %][c] | Engage 8200 | — | — | — | — | — | — |
| | | | | FA7220 | — | — | — | — | — | — |

[a] All used polymers are heterophasic and comprise a propylene random copolymer matrix A1 and a therein dispersed ethylene-propylene copolymer rubber phase B1.
[b] Weight percent with respect to the weight of the total composition.
[c] Weight percent with respect to the weight of the containing fraction, e.g. masterbatch, XCS or XCU fraction, intermediate D.

TABLE 3-4

| | | | | CE1 | CE2 | CE3 | CE4 | CE5 | CE6 |
|---|---|---|---|---|---|---|---|---|---|
| Analysis values of the final composition | MFR$_2$ | [g/10 min] | | 8.3 | 6.1 | 4.8 | 4.4 | 4.4 | 4.2 |
| | XCS | [wt %][b] | | 18 | 24 | 31 | 19 | 28 | |
| | Max. MAH | [wt %][b] | (calculated) | 0.15 | 0.07 | 0.07 | 0.07 | 0.07 | 0.07 |
| | $I_{MA}$, FTIR | [μm$^{-1}$][b] | (measured) | 0.0509 | | 0.0389 | 0.0335 | 0.0351 | |
| | Free MAH | [wt %][b] | (measured) | 0.15 | | 0.03 | 0.02 | 0.02 | |
| | Comonomer | [wt %][b] | | 9.7 | | 21.3 | 7.6 | 15.9 | |
| | Comonomer/XCU | [wt %][c] | | | | | | | |
| | Comonomer/XCS | [wt %][c] | | | | 63 | 29 | 51 | n/a |
| | Tensile Mod. 23° C. | [MPa] | | 1218 | 1039 | 900 | 662 | 603 | 549 |
| | Stress, yield | [MPa] | | 27 | 23 | 20 | 20 | 17 | 18 |
| | Elongation at yield | [%] | 1A | | 10 | 9 | 14 | 15 | 15 |
| | Stress, break | [MPa] | | 11 | 18 | 6 | 24 | 24 | 26 |
| | Elongation at break | [%] | | 85 | 430 | 222 | 530 | 612 | 642 |
| | Tensile Mod. −20° C. | [MPa] | | 3020 | 2454 | 2162 | 3108 | 2204 | |
| | Stress, yield | [MPa] | | 42 | 43 | 40 | 47 | 42 | |
| | Elongation at yield | [%] | 5A | 3 | 6 | 6 | 10 | 13 | |
| | Stress, break | [MPa] | | 35 | 55 | 51 | 37 | 51 | |
| | Elongation at break | [%] | | 37 | 287 | 267 | 186 | 267 | |
| | Charpy at 23° C. | [J/m$^2$] | | 15 | 12 | 50 | 12 | 49 | 18 |
| | Charpy at 0° C. | [J/m$^2$] | | 8 | | 10 | | 9 | 7 |
| | Charpy at −20° C. | [J/m$^2$] | | 6 | 4 | 8 | 2 | 3 | 2 |
| | Shore D | [Shore] | 1-100 | 59 | 58 | 58 | 56 | 53 | 55 |
| | Vicat A | [° C.] | | 157 | 140 | 133 | 121 | 114 | 115 |
| | Tm | [° C.] | | 164 | 163 | 165 | 157 | 157 | |
| | Tc | [° C.] | | | | 116 | 117 | 105 | 105 |
| | Peel strength 23° C. | [N/mm] | | | | | 575 | 290 | |
| | Peel strength 80° C. | [N/mm] | | | | | 208 | 115 | |

[a] All used polymers are heterophasic and comprise a propylene random copolymer matrix A1 and a therein dispersed ethylene-propylene copolymer rubber phase B1.
[b] Weight percent with respect to the weight of the total composition.
[c] Weight percent with respect to the weight of the containing fraction, e.g. masterbatch, XCS or XCU fraction, intermediate D.

The invention claimed is:

1. Heterophasic polypropylene composition having an MFR$_2$ (2.16 kg, 230° C.) of 3.0 to 7.0 g/10 min, determined according to ISO 1133, and a Vicat A50 softening temperature of more than 110° C. measured according to DIN EN ISO 306 at 10 N on an injection moulded test specimen with the dimensions of 80×10×4 mm$^3$ and a heat rate of 50° C./h
including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction) of 18 to 30 wt % based on the total weight of the heterophasic polypropylene composition, and a fraction insoluble in p-xylene at 23° C. (XCU fraction) of 70 to 82 wt % based on the total weight of the heterophasic polypropylene composition,
said heterophasic polypropylene composition having a tensile modulus of 450 to 850 MPa when measured according to ISO 527-2 at 23° C. temperature with an elongation rate of 1 mm/min on injection moulded test specimens type 1A prepared according to ISO 1873-2;
and a normalized maleic anhydride index $I_{MA}$ equal to or less than 0.036 μm$^{-1}$ determined by IR absorbance measurements being normalised to the measured film thickness (d) in units of microns.

2. Heterophasic polypropylene composition according to claim 1, wherein the XCS fraction is present in an amount of 18 to 28 wt. % with respect to the total heterophasic polypropylene composition.

3. Heterophasic polypropylene composition according to claim 1, wherein the amount of units derived from comonomers selected from ethylene, and/or C$_4$ to C$_{12}$ alpha olefins in the fraction insoluble in xylene (XCU fraction) is 1.0 to 5.2 wt.-% with respect to the total weight of the fraction being insoluble in p-xylene (XCU fraction).

4. Heterophasic polypropylene composition according to claim 1, wherein the amount of units derived from propylene in the fraction soluble in xylene (XCS fraction) is 45 to 75 wt.-% with respect to the total weight of the fraction being insoluble in p-xylene (XCU fraction).

5. Heterophasic polypropylene composition according to claim 1, wherein the Peel Strength at 23° C. is at least 200 N/mm measured according to IS021809-1.

6. Heterophasic polypropylene composition according to claim 1, wherein the fraction soluble in xylene (XCS fraction) contains an impact modifier comprising comonomers selected from the groups of C$_2$C$_3$, C$_2$C$_4$, or C$_2$C$_8$, or LDPE.

7. Heterophasic polypropylene composition according to claim 1, wherein the normalized maleic anhydride index $I_{MA}$ is equal to or less than 0.034 μm$^{-1}$, preferably equal to or less than 0.032 μm$^{-1}$ and most preferably equal to or less than 0.0315 μm$^{-1}$ determined by IR absorbance measurements being normalised to the measured film thickness (d) in units of microns.

8. Article comprising the heterophasic propylene polymer composition according to claim 1.

9. An article according to claim 8, whereby the article is a steel pipe coated with an epoxy layer, whereas a layer from the heterophasic polypropylene compositions is directly coated on top of said epoxy layer.

10. Heterophasic polypropylene composition having an MFR$_2$ (2.16 kg, 230° C.) of 3.0 to 7.0 g/10 min and having a tensile modulus of 450 to 850 MPa when measured according to ISO 527-2 at 23° C. temperature with an elongation rate of 1 mm/min on injection moulded test specimens type 1A prepared according to ISO 1873-2 and a Vicat A50 softening temperature of more than 110° C. measured according to DIN EN ISO 306 at 10 N on an injection moulded test specimen with the dimensions of 80×10×4 mm$^3$ and a heat rate of 50° C./h;
including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), whereby the heterophasic polypropylene composition is obtainable by
melt mixing a first heterophasic polypropylene composition (C1) in an amount of 40 to 86 wt.-% with 10 to 30 wt.-% of a second heterophasic polypropylene composition (C2), 0 to 15 wt.-% of an impact modifier (H), 3 to 9 wt.-% of a reactive masterbatch (G), 1.0 to 4.5 wt.-% of a colour masterbatch (F), in the presence of 0.5 to 2.0 wt.-% additives (E) with respect to the final heterophasic polypropylene composition,
whereby the first heterophasic polypropylene composition (C1) has an MFR$_2$ (2.16 kg, 230° C.) of 2.5 to 6.5 g/10 min and includes a propylene random copolymer matrix phase (A1) and an ethylene-propylene copolymer rubber phase (B1) dispersed within the matrix phase; and
whereby the second heterophasic polypropylene composition (C2) has an MFR$_2$ (2.16 kg, 230° C.) of 2.5 to 6.5 g/10 min and includes a propylene homopolymer matrix phase (A2) and an ethylene-propylene copolymer rubber phase (B2) dispersed within the matrix phase; and
whereby the ratio of weights between C1 and C2 (C1:C2) is 4:3 to 9:1, preferably 1:1 to 8:1, and more preferably 1:1 to 7:1, and
whereby the colour masterbatch (F) contains a polypropylene homo- or copolymer or an ethylene polymer carrier in an amount of 40 to 75 wt.-% and 25 to 60 wt.-% pigments with respect to the total weight of the colour masterbatch, and
whereby the reactive masterbatch (G) contains a polypropylene homopolymer having an MFR$_2$ (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the reactive masterbatch (G).

11. Heterophasic polypropylene composition according to claim 10, wherein the first heterophasic polypropylene has a comonomer content of 6 to 10 wt.-%, and/or wherein the fraction insoluble in p-xylene at 23° C. (XCU fraction) of the first heterophasic polypropylene includes 1.5 to 5.5 wt.-% ethylene.

12. Heterophasic polypropylene composition according to claim 10, wherein the fraction soluble in p-xylene at 23° C. (XCS fraction) of the first heterophasic polypropylene is present in an amount of 20 to 28 wt.-%.

13. Heterophasic polypropylene composition according to claim 10, wherein the fraction soluble in p-xylene at 23° C. (XCS fraction) of the first heterophasic polypropylene has an intrinsic viscosity of 1.20 to 1.40 dl/g in tetralin at 135° C., and/or wherein the second heterophasic polypropylene has a comonomer content of 8 to 15 wt.-%.

14. Heterophasic polypropylene composition having an MFR$_2$ (2.16 kg, 230° C.) of 3.0 to 7.0 g/10 min and having a tensile modulus of 450 to 850 MPa when measured according to ISO 527-2 at 23° C. temperature with an elongation rate of 1 mm/min on injection moulded test specimens type 1A prepared according to ISO 1873-2, and a Vicat A50 softening temperature of more than 110° C. measured according to DIN EN ISO 306 at 10 N on an injection moulded test specimen with the dimensions of 80×10×4 mm³ and a heat rate of 50° C./h;

including a propylene random copolymer matrix phase (A), and an ethylene-propylene copolymer rubber phase (B) dispersed within the matrix phase, wherein the heterophasic polypropylene composition has a fraction soluble in p-xylene at 23° C. (XCS fraction), and a fraction insoluble in p-xylene at 23° C. (XCU fraction), whereby the heterophasic polypropylene composition is obtainable by melt mixing a first heterophasic polypropylene composition (C1) in an amount of 54 to 79 wt.-% with 20 to 40 wt.-% of an intermediate (D) composition 1.0 to 4.5 wt.-% of a colour masterbatch (F) in the presence of 0.5 to 2.0 wt.-% additives (E), with respect to the final heterophasic polypropylene composition, whereby the first heterophasic has an $MFR_2$ (2.16 kg, 230° C.) of 2.5 to 6.5 g/10 min and includes a propylene random copolymer matrix phase (A1) and an ethylene-propylene copolymer rubber phase (B1) dispersed within the matrix phase; and whereby the ratio of weights between C1 and D (C1:D) is 5:4 to 8:2, preferably 1:1 to 7:2, and more preferably 1:1 to 6:2, and whereby the colour masterbatch (F) contains a polypropylene homo- or copolymer or an ethylene polymer carrier in an amount of 40 to 75 wt.-% and 25 to 60 wt.-% pigments with respect to the total weight of the colour masterbatch, and whereby the intermediate composition (D) is obtainable by melt mixing a second heterophasic polypropylene (C2) in an amount of 55 to 85 wt.-% with 15 to 30 wt.-% of a reactive masterbatch (G) and 0 to 15 wt.-% of an impact modifier (H) with respect to the intermediate composition (D), whereby the second heterophasic polypropylene (C2) has an $MFR_2$ (2.16 kg, 230° C.) of 2.5 to 6.5 g/10 min and includes a propylene homopolymer matrix phase (A2) and an ethylene-propylene copolymer rubber phase (B2) dispersed within the matrix phase; and whereby the reactive masterbatch (G) contains a polypropylene homopolymer having an $MFR_2$ (2.16 kg, 230° C.) of 40 to 70 g/10 min in an amount of 98.30 to 99.75 wt.-%, 0.2 to 1.5 wt.-% maleic anhydride and 0.05 to 0.20 wt.-% peroxide with respect to the polypropylene masterbatch (G).

15. Heterophasic polypropylene composition according to claim 14, wherein the first heterophasic polypropylene has a comonomer content of 6 to 10 wt.-%, and/or wherein the fraction insoluble in p-xylene at 23° C. (XCU fraction) of the first heterophasic polypropylene includes 1.5 to 5.5 wt.-% ethylene.

16. Heterophasic polypropylene composition according to claim 14, wherein the fraction soluble in p-xylene at 23° C. (XCS fraction) of the first heterophasic polypropylene is present in an amount of 20 to 28 wt.-%.

17. Heterophasic polypropylene composition according to claim 14, wherein the fraction soluble in p-xylene at 23° C. (XCS fraction) of the first heterophasic polypropylene has an intrinsic viscosity of 1.20 to 1.40 dl/g in tetralin at 135° C., and/or wherein the second heterophasic polypropylene has a comonomer content of 8 to 15 wt.-%.

18. Process for providing a field joint for a pipe or pipeline comprising the steps of:
a) providing at least two pipe segments optionally comprising factory coating;
b) at least partially removing the factory coating from the pipe segments to form a surface area;
c) welding the pipe segment to form a pipe or pipeline;
d) applying an epoxy layer to the surface areas of said welded steel pipe or pipeline;
e) curing said epoxy layer; and
f) applying a layer comprising a heterophasic polypropylene polymer composition on top of the epoxy layer;
whereby the heterophasic polypropylene polymer composition is the outermost layer of the pipe or pipeline.

19. Process for providing a field joint for a pipe or pipeline according to claim 18, whereby the heterophasic polypropylene polymer composition has
a $MFR_2$ (2.16 kg, 230° C.) of 3.0 to 15.0 g/10 min, determined according to ISO 1133;
a Vicat A50 softening temperature of more than 110° C. measured according to DIN EN ISO 306 at 10 N on an injection moulded test specimen with the dimensions of 80×10×4 mm³;
a heat rate of 50° C./h;
a fraction soluble in p-xylene at 23° C. (XCS fraction);
a fraction insoluble in p-xylene at 23° C. (XCU fraction);
a tensile modulus of 450 to 850 MPa when measured according to ISO 527-2 at 23° C. temperature with an elongation rate of 1 mm/min on injection moulded test specimens type 1A prepared according to ISO 1873-2; and
a normalized maleic anhydride index $I_{MA}$ equal to or less than 0.036 µm⁻¹ determined by IR absorbance measurements being normalised to the measured film thickness (d) in units of microns.

* * * * *